United States Patent [19]

Matsui et al.

[11] Patent Number: 4,667,627
[45] Date of Patent: May 26, 1987

[54] ENGINE PARTS AND METHOD OF PRODUCING THE SAME

[75] Inventors: Minoru Matsui, Nagoya; Nobuo Tsuno, Kasugai, both of Japan

[73] Assignee: NGK Insulators, Ltd., Japan

[21] Appl. No.: 700,738

[22] Filed: Feb. 12, 1985

[30] Foreign Application Priority Data

Feb. 28, 1984 [JP] Japan .................... 59-35190

[51] Int. Cl.4 ................................ F02F 7/00
[52] U.S. Cl. .................. 123/193 P; 92/212; 92/222; 92/220
[58] Field of Search ............... 92/212, 213, 216, 217, 92/219, 220, 222, 224, 248, 255, 260; 129/193 P

[56] References Cited

U.S. PATENT DOCUMENTS

| | | | |
|---|---|---|---|
| 4,419,925 | 12/1983 | Tsuzuki et al. | 92/212 |
| 4,433,616 | 2/1984 | Hauser, Jr. | 92/220 |
| 4,506,593 | 3/1985 | Sugiyama et al. | 92/212 |
| 4,530,341 | 7/1985 | Palm | 123/193 P |
| 4,535,683 | 8/1985 | Dworak et al. | 92/222 |

FOREIGN PATENT DOCUMENTS

| | | |
|---|---|---|
| 402349 | 9/1924 | Fed. Rep. of Germany ... 123/193 P |
| 106677 | 6/1974 | Fed. Rep. of Germany ... 123/193 P |
| 3110292 | 9/1982 | Fed. Rep. of Germany ... 123/193 P |

OTHER PUBLICATIONS

Japanese Patent Abstract 58-74,851.
Japanese Patent Abstract 58-74,852.
Japanese Patent Abstract 58-74,853.

Primary Examiner—Ronald B. Cox
Attorney, Agent, or Firm—Parkhurst & Oliff

[57] ABSTRACT

An engine part and a method of producing the same are disclosed. The engine part includes a ceramic member, a metallic member secured to the ceramic member, and a metallic engine part body fixed to the metallic member, wherein the outer peripheral portion of the metallic member has a diameter smaller than the outer diameter of the ceramic member and is provided at one end facing the ceramic member with an annular notch. The engine part is produced by securing the ceramic member to the metallic member through fitting or joining and then fixing the metallic member to the metallic engine part body through fitting or screwing.

16 Claims, 5 Drawing Figures

FIG_1
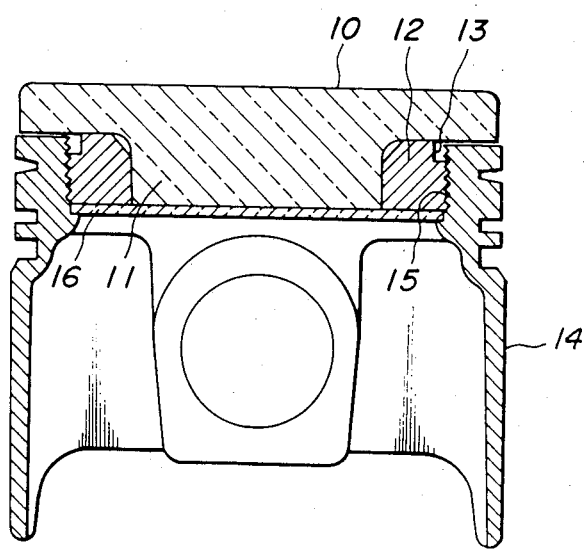
FIG_2
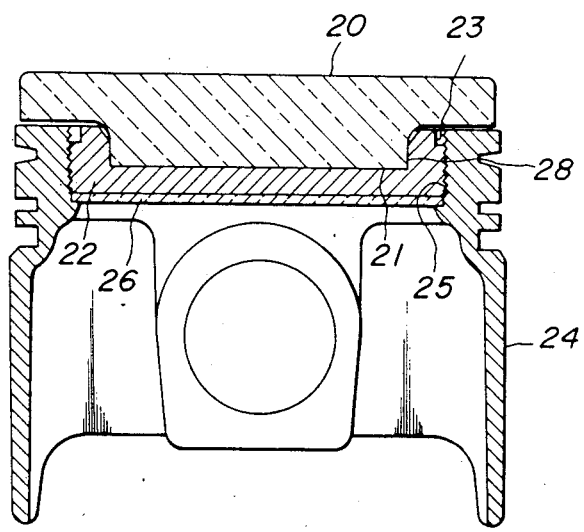

ENGINE PARTS AND METHOD OF PRODUCING THE SAME

BACKGROUND OF THE INVENTION

1. Field of the Invention:

This invention relates to internal combustion engine parts made of ceramic and metal and having excellent heat insulation, heat resistance and durability, and a method of producing the same.

2. Description of the Prior Art:

Since ceramic materials have excellent mechanical strengths, heat resistance, oxidation resistance and heat insulation, when that portion of an internal combustion engine which contacts with a high temperature combustion gas, such as a piston, a cylinder liner, a cylinder head or the like is composed of a ceramic material, it is possible to raise the combustion temperature and to reduce the heat loss, whereby an improvement of engine efficiency, reduction of harmful components in exhaust gas and the like can be expected. Further, when that portion of the engine which is subjected to repetitive shock loading, such as a tappet, a rocker arm pad or the like is composed of a ceramic material, the wear resistance is improved effectively. Therefore, there are proposed composite engine parts each composed of a combination of metal and ceramic.

For instance, pistons for an internal combustion engine produced by fixing a ceramic piston cap to a top of a metallic piston body through casting are disclosed in Japanese Patent laid open No. 58-95,674 and U.S. Pat. No. 4,245,611. In order to fix the ceramic piston cap to the metallic piston body by casting, however, it is necessary to mitigate the casting stress based on the difference in thermal expansion between the ceramic piston cap and the metallic piston body. For this purpose, there is proposed a method of mitigating the casting stress with a metallic ring provided on the ceramic piston cap (Japanese Patent laid open No. 58-95,674). In this method, however, it is required to form a flange portion for mounting the metallic ring onto the ceramic piston cap, so that not only the shape of the ceramic piston cap becomes complicated but also cracks are apt to occur in the corner portion of the flange due to the stress concentration.

Also, there is proposed a method wherein a cushion layer composed of fibrous ceramic material is interposed between the ceramic piston cap and the metallic piston body to mitigate the casting stress (U.S. Pat. No. 4,245,611). In this method, however, the fixing of the ceramic piston cap to the metallic piston body is insufficient due to the presence of the cushion layer, resulting in the loosening of the piston cap during the use of the piston.

Furthermore, when the ceramic piston cap is fixed to the metallic piston body by casting, it is necessary to preheat the piston cap for preventing the breaking of the piston cap due to the thermal shock produced by the pouring of molten metal, so that the casting operation becomes complicated.

In order to solve the above drawbacks accompanied with the casting, there is proposed a method wherein a metallic member is secured to the ceramic piston cap and then its outer peripheral portion is worked so as to be fixed to the metallic piston body by a mechanical bonding process such as shrink-fitting, screwing or the like. In this method, however, the ceramic piston cap may be broken by contacting with a working tool during the working on the outer peripheral portion of the metallic member.

SUMMARY OF THE INVENTION

It is an object of the invention to provide internal combustion engine parts made of ceramic and metal, which have excellent heat insulation, heat resistance and durability and are easy to work without breaking the ceramic member and free selection of a combination of materials constituting the ceramic member to interface with the metallic engine part are possible, and a method of producing the same.

According to the first aspect of the invention, there is provided an internal combustion engine part comprising a ceramic member, a metallic member secured to the ceramic member, and a metallic engine part body fixing the ceramic member through the metallic member; an outer periphery of said metallic member having a diameter smaller than the outer diameter of said ceramic member and being provided at an end facing said ceramic member with a ring notch; and said metallic member being fixed at its large diameter side to said metallic engine part body.

According to the second aspect of the invention, there is provided a method of producing an internal combustion engine part by fixing a ceramic member to a metallic engine part body through a metallic member, which comprises securing a metallic member, whose outer periphery has a diameter smaller than an outer diameter of a ceramic member and is provided at one end with a ring notch, to the ceramic member so as to locate the ring notch in the side of the ceramic member, subjecting the outer periphery at the large diameter side of the metallic member to a finish working, and fixing the finished worked portion of the metallic member to a metallic engine part body.

BRIEF DESCRIPTION OF THE DRAWINGS

The invention will be described in detail with reference to the accompanying drawings, wherein:

FIGS. 1 to 3 are schematically longitudinal sectional views of the pistons as an embodiment of the engine part according to the invention, respectively;

DETAILED DESCRIPTION OF THE INVENTION

Figure 3:
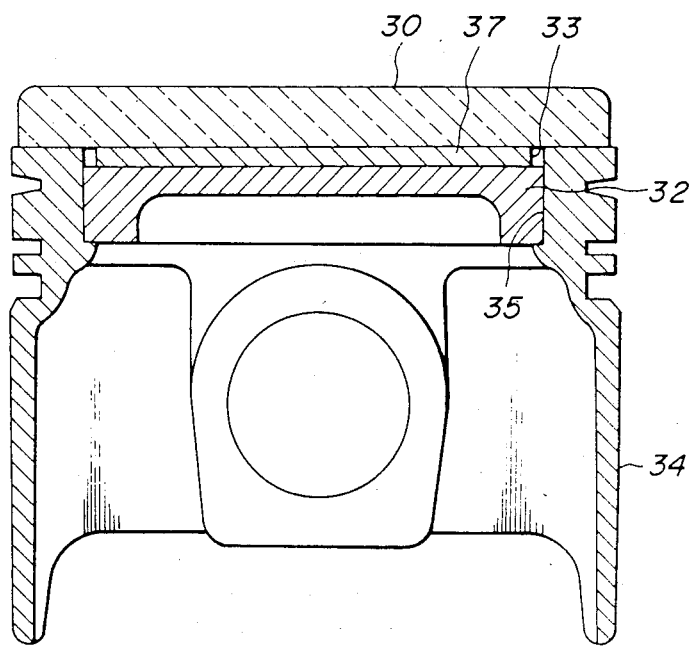

According to the invention, a ceramic member is secured with a metallic member, a diameter of its outer periphery being smaller than the outer diameter of the ceramic member, and then fixed to a metallic engine part body through the metallic member. Since the outer peripheral size of the metallic member is changed after it is secured to the ceramic member, the working on the outer peripheral portion of the metallic member is performed after it is secured to the ceramic member. Moreover, a ring notch is previously formed on one end of the outer peripheral portion of the metallic member facing the ceramic member by any process including turning, rounding and beveling. Therefore, a gap corresponding to a distance between the starting point of the notch and the surface of the ceramic member is formed on the outer peripheral portion of the metallic member, so that the contacting of the working tool with the surface of the ceramic member is removed during the working on the outer peripheral portion and consequently the working of the metallic member becomes easy and the breaking of the ceramic member is prevented. The depth and width of the ring notch formed in the metallic member are determined in accordance with the amount cut in the finished working of the outer peripheral portion, the shape and size of the working tool used and the working process.

The ceramic member is made from a ceramic material selected from the group consisting of zirconia, alumina, silicon nitride, silicon carbide and sialon. A metallic member having a coefficient of thermal expansion equal to or less than that of a metal constituting the metallic engine part body.

The securing between the ceramic member and the metallic member may be performed by shrink-fitting, pressfitting or joining through a metallized layer deposited on that surface of the ceramic member which contacts with the metallic member.

The term "metallized layer" used herein means a metallic layer formed by applying a paste composition consisting mainly of metal powder to a surface of the ceramic member for metallizing the surface of the ceramic member, drying and heating in a reducing atmosphere, a non-oxidizing atmosphere or a hydrogen atmosphere having an adjusted partial pressure of steam.

The process for the securing between the ceramic member and the metallic member may be determined in accordance with the kind of materials constituting each of the ceramic and metallic members and a combination thereof. For instance, when the metallic member is made from a metal having a low melting point, such as an aluminum alloy, or the like, shrink-fitting or press-fitting is preferable because it can achieve the securing to the ceramic member at a relatively low temperature. When the metallic member is made from a metal having a high melting point such as cast iron, steel or the like, shrink-fitting, press-fitting and joining through the metallized layer can be used.

The shrink-fitting and press-fitting can be applied to all combinations of ceramic material and metallic material. On the other hand, in the case of joining through the metallized layer, the composition of the metallized layer to be deposited on the ceramic member is selected in accordance with the ceramic material constituting the ceramic member. For instance, when the ceramic member is made from a partially stabilized zirconia containing $Y_2O_3$, a metallized layer consisting of 70-90 wt % of Mo, 0.5-15 wt % of MnO, 0.1-10 wt % of $Y_2O_3$, 0.1-15 wt % of $Al_2O_3$ and 0.1-15 wt % of $SiO_2$ is particularly preferable because it has a large joining strength.

The joining between the metallized layer and the metallic member may be carried out by brazing or diffusion bonding. In this case, a brazing material to be used or an insert metal in the diffusion bonding is determined in accordance with mechanical properties required in the joined portion such as joining strength, fatigue strength, high-temperature strength and the like. Moreover, when the metallized layer deposited on the ceramic member is joined to the metallic member, a metal having a coefficient of thermal expansion equal to or less than that of the metallic member may be interposed between the metallized layer and the metallic member as a cushion member for mitigating the difference in thermal expansion between the ceramic member and the metallic member.

The fixing between the metallic member secured to the ceramic member and the metallic engine part body is carried out by shrink-fitting or screwing.

In FIGS. 1 to 3 are sectionally shown the engine parts according to the invention, wherein the ceramic member is a piston cap and the metallic engine part body is a piston body.

The piston shown in FIG. 1 comprises a piston cap 10 made of silicon nitride, a cylindrical metallic member 12 made of an Fe-Ni alloy, the outer periphery of which has a diameter smaller than the diameter of a large diameter portion of the piston cap and being provided with a small annular notch 13 at one end facing the piston cap (i.e., at an outer side of the metallic member) and a piston body 14 made of an aluminum alloy. The piston cap 10 is fitted at its convex portion 11 into a through-hole formed in the metallic member 12 by shrink-fitting. Further, the piston cap 10 is fixed to the piston body 14 by screwing between a thread formed on the outer peripheral portion of the metallic member 12 and a thread formed on an inner peripheral surface 15 of a concave portion in the top of the piston body 14. If necessary, a heat insulating disc 16 made of a ceramic material may be placed on the bottom of the concave portion.

This piston may be produced as follows. First, a piston cap 10 of a predetermined shape is formed from silicon nitride, fired and then worked to a predetermined size. Separately, a disc-like or cylindrical metallic member is machined to form a through-hole at a central portion thereof for fitting a convex portion 11 of the piston cap therein and a ring notch 13 having a diameter smaller than the outer diameter of the metallic member at one end of the outer peripheral portion, while a top portion of the through-hole corresponding to the ring notch side of the metallic member is subjected to a beveling. Then, the convex portion 11 of the piston cap is shrink-fitted into the through-hole of the metallic member so as to locate the ring notch in the side of the piston cap while heating the metallic member at a predetermined temperature. The interference between the convex portion 11 and the metallic member due to shrink-fitting is determined so as to ensure a tightness required at the service temperature of the piston considering the coefficient of thermal expansion of a material constituting each of the piston cap 10 and the metallic member 12, and the diameter and service temperature of the fitted portion.

Thereafter, a thread of a predetermined size is formed on each of the large diameter portion in the outer periphery of the metallic member 12 and the inner peripheral surface 15 of the concave portion in the top of the piston body. Then, the piston cap is fixed to the piston body by screwing between the above threads. In this case, heat treatment is not required for fixing the piston cap to the piston body, so that even when using the heat-treated piston body, no change of mechanical strength occurs and consequently it is not required to again heat-treat the piston body after the piston cap is fixed to the piston body.

The piston shown in FIG. 2 comprises a piston cap 20 made of a zirconia ceramic, a metallic member 22 made of spheroidal graphite cast iron and provided at the outer peripheral end facing the piston cap with a ring notch 23 having a diameter smaller than the outer diameter of the metallic member 22, and a piston body 24 made of an aluminum alloy, wherein the piston cap 20 is secured to the metallic member 22 through a metallized layer (not shown) deposited on a bottom (i.e., inner) surface 21 of a convex portion of the piston cap. The piston cap 20 is fixed to the piston body 24 by screwing between a thread formed on the outer peripheral portion of the metallic member 22 and a thread formed on an inner peripheral surface 25 of a concave portion in the top of the piston body. If necessary, a heat insulating member 26 made of a ceramic material may be disposed beneath the bottom surface of the metallic member.

This piston may be produced as follows. First, a piston cap of a predetermined shape is formed from a partially stabilized zirconia ceramic containing $Y_2O_3$, fired and then worked to a predetermined size. Then, a paste-like composition consisting mainly of Mo-Mn-$SiO_2$-$Al_2O_3$ is applied to the bottom or inner surface 21 of the convex portion of the piston cap, dried and heated in a wet hydrogen atmosphere to form a metallized layer of a predetermined composition on the bottom or inner surface. Thereafter, the surface of the metallized layer is subjected to Ni plating.

Separately, a disc of spheroidal graphite cast iron is provided and worked at its one side to form a concave portion 28 for receiving the convex portion of the piston cap and a ring notch 23 having a diameter smaller than the outer diameter of the disc at the outer peripheral surface thereof facing the opening end of the concave portion 28, and further the inner peripheral surface of the concave portion is subjected to a beveling, whereby a metallic member 22 is produced. After the top or outer surface of the concave portion 28 is subjected to Ni plating, the convex portion 21 of the piston cap is inserted into the concave portion 28 of the metallic member and then the opposing surface of the convex portion 21 is placed into the concave portion 28 and they are joined to each other with a silver-brazing alloy. Thereafter, a thread of a predetermined size is formed on each of the outer peripheral surface at a large diameter side of the metallic member 22 and an inner peripheral surface 25 of a concave portion in the top of the piston body 24 for receiving the metallic member 22. Next, the piston cap is fixed to the piston body by screwing.

The piston shown in FIG. 3 comprises a disc-like piston cap 30 made of a zirconia ceramic, a metallic member 32 made of spheroidal graphite cast iron and having a diameter smaller than that of the piston cap, a disc-like titanium cushioning body 37 having a diameter smaller than that of the metallic member, and a piston body 34 made of spheroidal graphite cast iron, wherein the piston cap 30 is secured to the metallic member 32 by brazing through the titanium cushioning body 37 brazed to a metallized layer deposited on one side surface of the piston cap. Further, the piston cap 30 is fixed to the piston body 34 by shrink-fitting between the outer peripheral surface of the metallic member 32 and the inner peripheral surface 35 of the concave portion in the top of the piston body 34.

This piston may be produced as follows. First, a piston cap 30 of a predetermined shape is formed from a partially stabilized zirconia ceramic containing $Y_2O_3$, fired and worked to a predetermined size. Then, a metallized layer of a predetermined composition is deposited on one side surface of the piston cap and subjected to Ni plating. Separately, the metallic member 32 is subjected at one side surface to Ni plating. Then, a titanium disc 37 having a diameter smaller than that of the metallic member 32 is interposed between the Ni-plated surface of the metallic member 32 and the surface of the metallized layer deposited on the piston cap 30 they are brazed to each other. As the brazing material, there is used a brazing alloy giving a joining strength required at the service temperature of the piston, such as silver-brazing alloy, Cu-Mn-brazing alloy or Ni-brazing alloy.

Thereafter, the outer peripheral surface of the metallic member 32 is worked to a predetermined size. In the embodiment of FIG. 3, the outer peripheral surface 33 of the titanium disc 37 plays the same role as the ring notches 13, 23 shown in FIGS. 1 and 2, so that there is no breaking of the piston cap during the working on the outer peripheral surface of the metallic member 32.

Then, the piston body 34 provided at the top with a concave portion of a predetermined size for receiving the metallic member is heated to a predetermined temperature, and the metallic member 32 is shrink-fitted into the concave portion of the piston body, whereby the piston cap is fixed to the piston body 34. The shrink-fitting temperature is desirable to be not more than the melting temperature of the brazing material used in the securing between the piston cap 30 and the metallic member 32 and be a temperature causing no structure change of the metal constituting the piston body. Further, the interference of the shrink-fitting is of a sufficient size to provide a tightness required at the service temperature of the piston.

Figure 4:
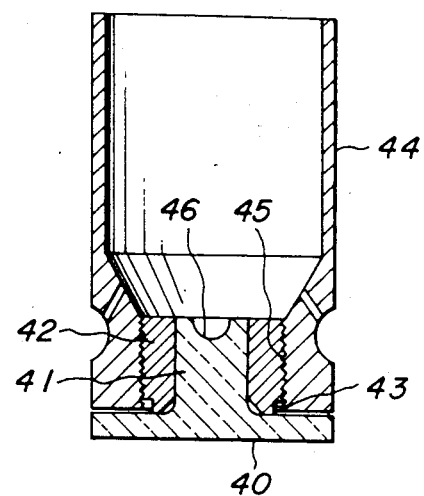
FIG. 4 is a schematically longitudinal sectional view of the tappet as another embodiment of the engine part according to the invention.

In FIG. 4 an engine part according to the invention is shown in section, wherein the ceramic member is a cam-contacting surface and the metallic engine part body is a tappet body. That is, the tappet of FIG. 4 comprises a cam-contacting surface 40 made of a zirconia ceramic, a cylindrical metallic member 42 made of steel and provided at the end side facing the cam-contacting surface with a small size ring notch 43, and a tappet body 44 made of cast iron. The convex portion 41 of the cam-contacting surface 40 is fitted into the through-hole of the metallic member 42 by shrink-fitting, while the cam-contacting surface 40 is fixed to the tappet body 44 by screwing between a thread formed on the outer peripheral surface of the metallic member 42 and a thread formed on an inner peripheral surface 45 of a hole in the tappet body 44. On the top surface of the convex portion 41 of the cam-contacting surface 40 is formed a concave portion 46 for contacting with a push rod.

Figure 5:
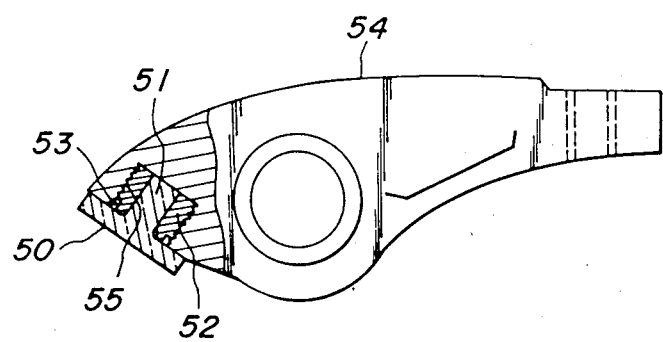
FIG. 5 is a side view partly shown in section of the rocker arm as another embodiment of the engine part according to the invention.

In FIG. 5 is shown the engine part according to the invention, wherein the ceramic member is a rocker pad and the metallic engine part body is a rocker arm body. That is, the rocker arm of FIG. 5 comprises a rocker pad 50 made of zirconia ceramics, a metallic member 52 made of steel and provided at one end with a small size ring notch 53, and a rocker arm body 54 made of aluminum alloy. The convex portion 51 of the rocker pad 50 is fitted into the through-hole of the metallic member 52 by press-fitting, while the rocker pad 50 is fixed to the rocker arm body 54 by screwing between a thread formed on the outer peripheral surface of the metallic member 52 and a thread formed on an inner peripheral surface 55 of a concave portion in the rocker arm body 54. Moreover, the press-fitting of the rocker pad 50 into the metallic member 52 is carried out at a temperature of not less than the service temperature in the fitted portion for preventing the loosening of the rocker pad from the fitted portion during use.

As mentioned above, in the engine part according to the invention, the ceramic member is fixed to the metallic engine part body through the metallic member, whose outer peripheral portion has a diameter smaller than the outer diameter of the ceramic member and is provided at one end facing the ceramic member with a ring notch having a size slightly smaller than the diameter of this outer peripheral portion, so that the presence of the ring notch in the outer peripheral portion of the metallic member not only facilitates the finish working on the outer periphery of the metallic member after the securing to the ceramic member but also produces no breaking of the ceramic member during the finish working.

Furthermore, the metallic member secured to the ceramic member can be bonded to the metallic engine part body without heat treatment, so that the ceramic member can be fixed to the heat-treated metallic engine part without changing the nature of the engine part body. Moreover, the ceramic member can be fixed to the engine part body made of a low-melting alloy such as aluminum alloy or the like without using a complicated production process such as insert-casting or the like. Thus, the invention easily provides engine parts having an improved heat insulation, corrosion resistance or wear resistance by utilizing the properties inherent to the ceramic material such as heat insulation, heat resistance, corrosion resistance, wear resistance and the like.

What is claimed is:

1. An internal combustion engine part comprising:
   a ceramic member having an outer peripheral portion with an outer diameter;
   a solid metallic member having an outer peripheral portion which has a diameter which is smaller than said outer diameter of the ceramic member;
   a metallic engine part body having an inner peripheral portion with an inner diameter, said outer peripheral portion of the solid metallic member being fixed to the inner peripheral portion of the metallic engine part and said solid metallic member fixing said ceramic member to the metallic engine part, said solid metallic member having an annular notch which is located at least partially on said outer peripheripal portion of said solid metallic member between said solid metallic member and said ceramic member.

2. An internal combustion engine part comprising:
   a ceramic member including a large diameter portion and a convex portion, said large diameter portion having an outer surface, an inner surface and an outer peripheral diameter, and said convex portion having an outer peripheral diameter;
   a solid metallic member having an outer peripheral portion which has a diameter which is smaller than said outer peripheral diameter of the large diameter portion of the ceramic member and an inner peripheral portion with an inner diameter, said outer peripheral diameter of the convex portion of the ceramic member being fixed to said inner peripheral portion of the solid metallic member, and said solid metallic member having an annular notch which is located at least partially on said outer peripheripal portion of the solid metallic member; and
   a metallic engine part body having an inner peripheral portion with an inner diameter, said outer peripheral portion of the solid metallic engine part being fixed to the inner peripheral portion of the metallic engine part, such that said annular notch in said solid metallic member creates a space located between said inner surface of the large diameter portion of the ceramic member, said solid metallic member and said inner peripheral portion of the metallic engine part.

3. A method of producing an internal combustion engine part by fixing a ceramic member to a metallic engine part body through a metallic member, comprising:
   securing a metallic member having a solid structure to said ceramic member, said metallic member having an outer peripheral diameter smaller than an outer diameter of said ceramic member, and being provided at an outer peripheripal portion thereof with an annular notch, such that said annular notch is located between said solid metallic member and said ceramic member;
   subjecting an outer peripheral portion of said metallic member to a finishing machining; and
   fixing the finished machined portion of said metallic member to a metallic engine part body.

4. The internal combustion engine part according to claim 1, wherein said ceramic member is fixed to said metallic member by shrink-fitting.

5. The internal combustion engine part according to claim 1, wherein said ceramic member is fixed to said metallic member by a fixing means selected from the group consisting of a metallized layer deposited on said ceramic member and a metal cushioning body bonded to said metallized layer.

6. The internal combustion engine part according to claim 5, wherein said metal cushioning body bonded to the metallized layer of said ceramic member forms a part or all of said annular notch on the outer peripheral portion of said metallic member.

7. The internal combustion engine part according to claim 1, wherein said metallic member is fixed to said metallic engine part body by a fixing means selected from the group consisting of pressure-fiting, shrink-fitting and screwing.

8. The internal combustion engine part according to claim 1, wherein said ceramic member comprises at least one ceramic material selected from the group consisting of zirconia, alumina, silicon nitride, silicon carbide and sialon, and said metallic engine part body comprises at least one metallic material selected from the group consisting of cast iron, steel and aluminum alloys.

9. The method according to claim 3, wherein said ceramic member is fixed to said metallic member by shrink-fitting.

10. The method according to claim 3, wherein said cermeic member is fixed to said metallic member by a fixing means selected from the group consisting of a metallized layer deposited on said ceramic member and a metal cushioning body bonded to said metallized layer.

11. The method according to claim 3, wherein said metallic member is fixed to said metallic engine part body by a fixing means selected from the group consisting of pressure-fitting, shrink-fitting and screwing.

12. The internal combustion engine part according to claim 1, wherein said solid metallic member has an inner peripheral portion with an inner diameter and said ceramic member has a convex portion which fits into said inner peripheral portion of said solid metallic member.

13. The internal combustion engine part according to claim 12, wherein a portion of said inner peripheral portion of the solid metallic member is bevelled such that a space is created between the metallic member and the ceramic member.

14. The internal combustion engine part according to claim 2, wherein said outer peripheral diameter of the convex portion of the ceramic member is fixed to the inner peripheral portion of the solid metallic member by shrink-fitting.

15. The internal combustion engine part according to claim 2, wherein said outer peripheral portion of the solid metallic member is fixed to the inner peripheral portion of the metallic engine part by a fixing means selected from a the group consisting of pressure-fitting, shrink-fitting and screwing.

16. The internal combustion engine part according to claim 2, wherein said cermic member comprises at least one ceramic material selected from the group consisting of zirconia, alumina, silicon nitride, silicon carbide and sialon, and said metallic engine part comprises at least one metallic material selected from the group consisting of cast iron, steel and aluminum alloys.

* * * * *